| United States Patent [19] | [11] Patent Number: 4,642,011 |
| --- | --- |
| Uramoto et al. | [45] Date of Patent: Feb. 10, 1987 |

[54] COMPOSITION FOR RUST PREVENTION OF METALS AND THREADED METAL ELEMENTS WITH A RUSTPROOF FILM

[75] Inventors: Yoshihito Uramoto, Tokai; Takasi Kaneko, Toyoake; Toshiro Hirose, Nagoya, all of Japan

[73] Assignee: Toacosei Chemical Industry Co., Ltd., Tokyo, Japan

[21] Appl. No.: 553,331

[22] Filed: Nov. 18, 1983

[30] Foreign Application Priority Data

Nov. 22, 1982 [JP] Japan ................................. 57-203758
Dec. 28, 1982 [JP] Japan ................................. 57-227789

[51] Int. Cl.$^4$ ............................................. F16B 39/22
[52] U.S. Cl. .................................... 411/258; 428/592; 428/624; 428/418; 411/903; 411/914
[58] Field of Search ....................... 428/418, 624, 592; 411/903, 259, 1, 914, 258; 427/409; 10/1 R

[56] References Cited

U.S. PATENT DOCUMENTS

| | | | |
| --- | --- | --- | --- |
| 3,022,197 | 2/1962 | Jedlicka ................................ | 411/914 |
| 3,166,527 | 1/1965 | Ender ................................... | 428/418 |
| 3,309,253 | 3/1967 | Schnurrbusch et al. ........... | 411/258 |
| 3,547,851 | 12/1970 | Fravenglass .......................... | 41/258 |
| 3,814,156 | 6/1974 | Buchmann et al. ................. | 411/903 |
| 4,290,337 | 9/1981 | Kuwata et al. ...................... | 411/903 |
| 4,362,450 | 12/1982 | Hasegawa et al. .................. | 411/903 |

FOREIGN PATENT DOCUMENTS 1921753  11/1970  Fed. Rep. of Germany ...... 411/903

*Primary Examiner*—Melvyn J. Andrews
*Assistant Examiner*—John J. Zimmerman
*Attorney, Agent, or Firm*—Browdy and Neimark

[57] ABSTRACT

A composition for rust prevention of metals consisting essentially of (a) an organic silicon compound having an aminoalkyl group and at least one alkoxy group and (b) a compound having at least one oxirane ring. Said composition exhibits its effects particularly when applied on threaded metal elements.

19 Claims, No Drawings

COMPOSITION FOR RUST PREVENTION OF METALS AND THREADED METAL ELEMENTS WITH A RUSTPROOF FILM

BACKGROUND OF THE INVENTION

1. Field of the Invention

The present invention relates to a composition for rust prevention of metals. More particularly, the present invention relates to a composition for rust prevention of metals which is stably present at room temperature, and when coated on metal surfaces, forms an effective film by the action of water present in the air or by slight heating, thereby exhibiting a good rust prevention property. Particularly, it relates to a composition for rust prevention suitable for copper, copper alloys, such as brass, nickel silver, etc. and metals coated with a chromate film having a color such as yellow, black, green or the like.

2. Description of the Prior Art

Treatement of metals for rust prevention has been conventionally conducted by various methods such as (a) a method wherein various coating compositions, for example, those of thermosetting resins, for example, epoxy resin, alkyd resin, polyester resin, acrylic resin, urethane resin and other resins, of solvent type, aqueous type or powder type, are applied to metal substrates and baked, (b) a method wherein thermoplastic resins such as polyolefins, polyamides, polyesters and the like are melt-coated on metal substrates, (c) a method wherein various oils (mineral oils, animal oils and vegetable oils) are coated on metal substrates, (d) a method of plating or surface-treating with a metal, a metal salt or the like. In methods (a) and (b) of applying a thermosetting or thermoplastic resin coating composition, a sufficient rust prevention cannot be exhibited even in a system where a corrosion-resistant pigment of chromate type, phosphate type or other types is added, unless the coating composition is applied in a thickness as large as 10 to 2,000 $\mu$m. Further, because a high temperature is required for baking or melt-application of the coating composition, substrates may be impaired and heat energy may be lost. The method (c) of coating metal substrates with an oil is used only for temporary rust prevention and the oil which is originally a "stain" under the conditions under which the substrates are used is usually removed. The method (d) of surface-treatment gives much poorer rust prevention than the methods (a) and (b) of applying the above coating composition, and the surface treatment is ordinarily used to form an undercoat for the coating composition. Even in the case of metal-plating, for example, a chromate film is deteriorated when exposed to a high temperature of 50° to 80° C. or higher and loses its rust-preventing ability completely.

SUMMARY OF THE INVENTION

According to the present invention, there is provided a composition for rust prevention of metals consisting essentially of an organic silicon compound having at least one aminoalkyl group and at least one alkoxy group (hereinafter referred to as component A) and a compound having at least one oxirane ring (hereinafter referred to as component B).

DETAILED DESCRIPTION OF THE INVENTION

The composition of the present invention can be applied to a wide range of substrates, and shows its effects more conspicuously when applied to metals such as copper, copper alloys, chromate-coated iron and zinc, and the like. The copper alloys mentioned above are, for example, brass (an alloy consisting of 67% by weight of copper and 33% by weight of zinc), nickel silver (an alloy consisting of 50% by weight of copper, 25% by weight of zinc and 25% by weight of nickel) and the like. The chromate film is a surface film formed on a metal by immersing the metal in a treating solution composed mainly of chromic acid or a chromate and a mineral acid, and refers to, for example, a film of $xCr_2O_3 \cdot yCrO_3 \cdot zH_2O$.

The composition of the present invention, when applied to metal substrates, gives the following advantages (hereinafter, metal substrates refer to metals per se or metals to which a surface treatment such as plating or the like has been applied):

1. A film of the present composition can be formed by merely immersing a metal substrate in the present composition, preferably in a solution of the present composition in a solvent and then air-drying or slightly heating the substrate. In this way, a good rust preventing property can be very easily imparted to the metal substrate.

2. The film of the present composition formed on a metal substrate shows a good rust preventing property even if the film is as thin as 1 to 10 $\mu$m. Accordingly, no problem arises in the workings and in the course of using the coated metal substrate owing to an increase of the thickness of the metal substrate due to the film applied.

3. The film of the present composition is transparent, and therefore, does not adversely affect the color of substrate.

4. The present composition does not require addition of any toxic rust-preventive pigment, and therefore, is advantageous from the standpoint of environmental hygiene.

Specific examples of the organic silicon compound which is the component A of the present composition include, for example, aminoalkyltrialkoxysilanes having an aminoalkyl group and three alkoxy groups such as aminomethyltriethoxysilane, $\gamma$-aminopropyltriethoxysilane, $\gamma$-aminoisobutyltrimethoxysilane and the like; N-(aminoalkyl)aminoalkyltrialkoxysilanes having an N-(aminoalkyl)aminoalkyl group and three alkoxy groups such as N-($\beta$-aminoethyl)aminomethyltrimethoxysilane, N-($\beta$-aminoethyl)aminomethyltriethoxysilane, N-($\beta$-aminoethyl)-$\gamma$-aminopropyltrimethoxysilane and the like; aminoalkylalkyldialkoxysilanes having an aminoalkyl group and two alkoxy groups such as aminomethylmethyldiethoxysilane, $\gamma$-aminopropylmethyldiethoxysilane and the like; N-($\beta$-aminoethyl)-$\gamma$-aminopropylmethyldimethoxysilanes having an N-(aminoalkyl)aminoalkyl group and two alkoxy groups; and so forth. Thus, organic silicon compounds each having at least two alkoxy groups are preferable as the component A of the present composition for their higher rust preventing ability.

The component B, which is another essential component of the present composition, is a compound having at least one oxirane ring. For the compound B, there can be used conventional epoxy resins, for example, bisphenol A and F type epoxy resins represented by the formula,

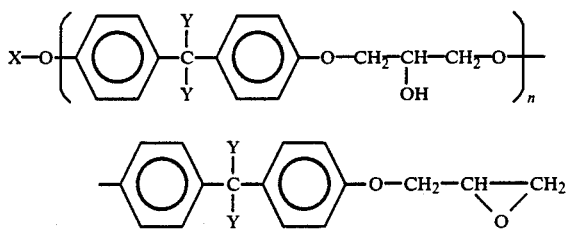

wherein X is

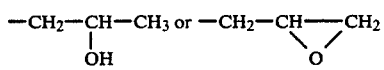

or a hydrogen atom and Y is an alkyl group or a hydrogen atom; glycidylamine type epoxy resins represented by the formula,

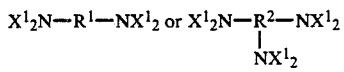

wherein $X^1$ is

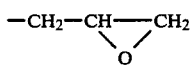

and $R^1$ is an alkylene group, an aralkylene group, a cycloalkylene group or the like and $R^2$ is an aliphatic hydrocarbon residue; novolak type epoxy resins represented by the formula,

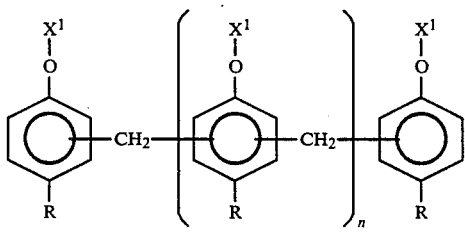

wherein $X^1$ is

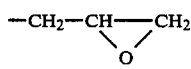

and R is an alkyl group, an aralkyl group or the like. Also, other compounds having oxirane rings than the above epoxy resins can be used.

Said other compounds having at least one oxirane ring than the epoxy resins include organic silicon compounds having an oxirane ring and alkoxy groups. These compounds include, for example, glycidoxyalkyltrialkoxysilanes such as γ-glycidoxypropyltrimethoxysilane and the like, glycidoxyalkylalkyldialkoxysilanes such as γ-glycidoxypropylmethyldimethoxysilane and the like, and so forth. These organic silicon compounds having an oxirane ring and alkoxy groups are preferably used in the present invention.

The ratio of the component B to the component A in the present composition is preferably 0.05 to 1 : 1, more preferably 0.2 to 0.9 : 1, in terms of molar ratio based on average molecular weight. When the component B is used in a proposition of less than 0.05 mole per mole of the component A, the resulting composition is stable, but an effective bond between the oxirane ring and the amino group is not substantially formed, and consequently, the composition has too low a solution viscosity when applied onto metal substrates, and has a low film-forming ability. For these reasons, the resulting film does not possess properties and a thickness sufficient to give good rust prevention. When the proportion of the component B exceeds 1 mole, the resulting composition is not stable and tends to cause thickening - gelation, and the film formed lacks toughness and accordingly is liable to be damaged by external forces and the like, resulting in a lessening of rust prevention.

The composition of the present invention can give good results when it consists of only the component A and the component B. However, in order to obtain an appropriate applicability and stability, it is preferable to properly dilute the composition with a solvent. As the solvent, there may be used polar and non-polar solvents such as, for example, benzene, toluene, xylene, cyclohexane, acetone, methyl ethyl ketone, methanol, ethanol, isopropanol, diethyl ether, Cellosolve, methyl Cellosolve and the like. These solvents may be used alone or in admixture of two or more. The total concentration of the components A and B in the composition containing a solvent is preferably 1 to 30% by weight.

The composition of the present invention may contain other components than the components A and B. For example, the composition may contain a rust-preventing agent of amine type, phosphate type or other types in a proportion within a range not causing a phenomenon of gelation to thickening. Also, the present composition may contain a slight amount of water or the like for the purpose of increasing the molecular weight of the composition by formation of siloxane bonds.

Where the present composition is applied onto metal substrates, a film is considered to be formed by bonding between the oxirane ring and the amino group as well as the formation of siloxane bonds due to alcohol removal from the organic silicon compound containing at least one alkoxy group. A good film is formed by slight heating, moisture absorption, or the like, and therefore, such a troublesome step as to heat metal substrates to high temperatures is not required for the film formation.

As aforementioned, the present composition can overcome the drawbacks of chromate film to exhibit its excellent performance in rust prevention. That is, chromate films are usually in wide use as protective platings for most metals such as zinc, cadmium, aluminum, copper and the like, and have not only fine appearances but also effective corrosion resistance. The greatest drawback of chromate films is a sharp decrease in corrosion resistance upon heating, and it can be confirmed from many experiments that, when metals to which these films have been applied are heated to, for example, 80° C. or above, the corrosion resistance of these metals measured by salt spray test (JIS Z 2371) drops virtually to the level of these metals per se having no chromate films. As causes for the above drawback, there are mentioned (a) formation of cracks brought about by thermal dehydration of chromate films or the like, (b) thermal conversion of soluble chromium compound to insoluble one, and (c) others. Hitherto, no effective remedy for decrease of corrosion resistance of chromate films has been developed in such a case. It is often required that chromate-treated metals be applied to places to be heated or be heat-processed to form new products. In order to solve the above problems occuring in these applications, many efforts have been made. Even where the present composition is applied onto a chromate film having no thermal history and then heated, or the composition is applied onto a chromate film which has already been heated and destructed, the rust prevention obtained is surprisingly equivalent to or higher than the rust prevention of the chromate film before heating, and this is one important feature of the present invention. According to the present invention, metal substrates such as copper, copper alloys and various chromate-plated metals can be easily subjected to rust prevention treatment, whereby their rust preventing properties can be enhanced greatly. Further, metal substrates treated with the present composition can be applied in a variety of mechanical sections without worrying about thermal deterioration of corrosion resistance of these metal substrates. For these reasons, the present invention greatly contributes to related industries.

The composition of the present invention is used for the production of threaded metal elements, specifically threaded metal elements having excellent corrosion resistance.

Threaded elements as a tightening means, namely, bolts, nuts, screws, etc. are widely used in articles for daily use, industrial and transportation machinery and tools, buildings and the like, and play an important role as tightening parts in each of the machinery and tools and structures. Of these elements, threaded metal elements are being used in the largest number and yet in important portions receiving stresses, becuase of their high load-carrying ability.

Threaded metal elements are excellent in quality and performance, inexpensive and numerous in kind and have been used for many years. However, when they are used for tightening between metals and exposed to unfavorable conditions such as high humidity conditions, the substrate metal of the threaded metal elements is corroded and fastened with rust, whereby detaching of the threaded metal elements become impossible and further the threaded metal elements per se in use are damaged or fall off. These are serious drawbacks of the threaded metal elements. In order to suppress the corrosion of the threaded metal elements as mentioned above, the following various treatments have been employed up to date. For conventional threaded metal elements using steel as their substrates, there have been employed, for example, oxide film coating, plating with a base metal or a precious metal, composite plating with metals, chemical treatment with a metal salt- or heavy metal acid-containing solution, coating with an oil, a thermoplastic resin or a thermosetting resin, etc. Of these treatments, the oxide film coating cannot essentially provide a corrosion-resistant film over a long period of time and is usually followed by further coating with an oil, grease or the like before use.

The metal plating can show a fine appearance when some metals are used in the plating and keeps corrosion resistance over a long period of time. However, because the plating film is hard, cracks are formed owing to stress, heat cycle, etc., whereby the corrosion resistance is reduced. Further, in tightening locations, the corrosion rate is accelerated greatly by local electrochemical reaction (galvanic corrosion reaction) between a threaded element and a metal to be tightened or between metals to be tightened. The chemical treatment also has similar drawbacks. The zinc chromate treatment employed most frequently in the case of metal-plated threaded elements is to form a film consisting of hydrates of chromic acid-dichromic acid or the like on a zinc plating, and the thus treated articles are used with admiration in many fields. Similarly to plating films, this chromate film is also liable to crack and deteriorate, and when it is subjected to a stress or a temperature of 60° to 80° C. or more, it is easily destructed, resulting in great reduction of its corrosion resistance. In the case of resin coating, a thick film must be formed in order to obtain the required corrosion resistance, and the thick film reduces the dimensional precision of threaded elements. Therefore, the maintenance of precision in tightening becomes difficult.

The above mentioned problems can be solved by applying onto the surface of a threaded metal element the composition of the present invention consisting essentially of (a) an organic silicon compound having at least one aminoalkyl group and at least one alkoxy group (component A) and (b) a compound having at least one oxirane ring (component B), and forming a film of the reaction product of the two components A and B on said surface. This reaction product film has great characteristics in that it is thin and yet has excellent corrosion resistance without requiring any special film-forming treatment, and particularly, it is excellent in that it contributes greatly to the prevention of the aforementioned reduction of the corrosion resistance of a chromate film due to its destruction and deterioration. The characteristics of the threaded element of the present invention are as follows:

1. Being excellent in corrosion resistance, the threaded element of the present invention can be applied to positions which are exposed to highly corrosive environments.

2. Because the film of the reaction product is transparent, the fine appearance and/or lustre of the metal substrate surface or the the metal-plated surface can be kept as it is.

3. Since the film is thin, the dimensional precision of threaded element is not reduced, and accordingly, problems in tightening, such as insufficient tightening, do not occur.

4. Because the corrosion resistance of the threaded element is not reduced by heat or stress, it can be applied even to positions which are subjected to high temperatures or high tension. Further, the threaded element can be heat-processed without sacrifying its corrosion resistance.

Threaded metal elements to which the composition of the present invention can be suitably applied include threaded elements made of metal materials such as iron, steel, stainless steel, aluminum, copper, brass, gunmetal and the like; steel plate plated with chromium, nickel, zinc or the like; and metal materials treated with a phosphate, a Unichrome TM solution, an alkali with boiling, or the like. Particularly, threaded elements made of a metal treated with a chromate (such as chromate-coated iron, chromate-coated steel, chromate-coated chromium-plated iron, chromate-coated nickel-plated iron, chromate-coated zinc-plated iron, chromate-coated chromium-plated steel, chromate-coated nickel-plated seel or chromate-coated zinc-plated steel exhibits best the effect of the present invention.

In the present invention, threaded elements refer to tightening means each having a thread, representatives of which are bolts, nuts, screws, etc., and include even threaded portions of machinery, tools, etc.

The effect of the composition for rust prevention of metal of the present invention is exhibited more characteristically when the threaded elements have a chromate plating as a protective film and further have thereon a thermoplastic resin film as a self-locking material.

That is, threaded elements having a thermoplastic resin film as a self-locking material are excellent in self-locking property, repeated use, sealing property and workability. However, in these threaded elements, owing to heating required for melt-coating the thermoplastic resin, the chromate film is usually damaged severely and the corrosion resistance is inferior. On the other hand, both (a) threaded elements obtained by melt-coating a thermoplastic resin on the threaded metal element of the present invention in which the metal substrate is coated with a chromate film which is further coated with the film of reaction product of this invention and (b) threaded elements of the present invention obtained by applying a primer onto a chromate-coated metal substrate, melt-coating thereupon a thermoplastic resin, and further forming thereupon the film of reaction product of the present invention, are very excellent in corrosion resistance, and equivalent or superior in corrosion resistance to threaded elements having a chromate film which has not been heated. This is quite surprising. Thus, the corrosion resistance of threaded elements having applied thereto a thermoplastic resin as a self-locking material have been enhanced by the present invention, and hence, the present invention contributes greatly to various industries including automotive engineering.

DESCRIPTION OF PREFERRED EMBODIMENTS

The present invention will be explained below in more detail referring to Examples and Comparative Examples.

EXAMPLE 1 AND COMPARATIVE EXAMPLE 1

11.05 Grams (0.05 mole) of a γ-aminopropyltriethoxysilane (molecular weight: 221) and 3.35 g (0.01 mole) of a bisphenol A type epoxy resin [Epikote 828 (brand name) manufactured by Yuka Shell Epoxy K.K., average molecular weight: 335] were diluted with 129.6 g of a mixed solvent consisting of equal parts by weight of toluene and methyl ethyl ketone, whereby a composition containing 10% by weight of the above effective components was obtained.

In the above composition were immersed a copper plate and a brass plate each having a size of 25 mm × 100 mm × 3 mm (thickness) (manufactured by Nippon Test Panel Kogyo Co., Ltd.) After having been taken out and air-dried, these plates were heated for 1 hr at 50° C., whereby a corrosion-resistant film having an average thickness of 3 to 5 μm were formed on the surface of each metal plate. The resulting coated test plates, together with test plates for Comparative Example 1 which had been subjected only to degreasing treatment, were evaluated by a salt spray test (JIS Z 2371), to obtain the results shown in Table 1.

It was confirmed that there was a big difference in corrosion resistance between the plate treated with the composition of the present invention and the plate which has not been treated with the present composition.

TABLE 1

| | Coating composition | After 96 hr of salt spray test | |
|---|---|---|---|
| | | Copper plate | Brass plate |
| Example 1 | γ-Aminopropyltri-ethoxysilane/Epikote 828 = 1/0.2 (mole ratio) (coating concentration: 10% by weight) | No rust observed | No rust observed |
| Comparative Example 1 | — | Dots of verdigris observed | Turned to red (Rusted) |

EXAMPLES 2 TO 4 AND COMPARATIVE EXAMPLES 2 to 3

0.05 Mole of N-(β-aminoethyl)-γ-aminopropyltrimethoxysilane and 0.015 mole of γ-glycidoxypropyltrimethoxysilane were diluted with a mixed solvent consisting of equal parts by weight of toluene and methyl Cellosolve, to prepare a composition containing 10% by weight of the above effective components.

Each test plate was prepared as follows: To a steel plate (SPCC-SD) of 25 mm × 100 mm × 0.5 mm (thickness) was applied an alkaline zinc plating to form a zinc plating of 15 μm thickness on the steel plate. After water washing, the plate was immersed in 3% nitric acid solution for 15 sec. After a further water washing, the zinc-plated steel plate was immersed for 15 sec at room temperature in chromate-treatment solution containing sodium dichromate, anhydrous chromic acid, nitric acid and sulfuric acid in amounts of 150 g, 50 g, 50 ml and 10 ml, respectively, per liter. After having been taken out and allowed to stand in air for 15 sec, the resulting plate was water-washed and air-dried to obtain a chromate-treated zinc-plated steel plate as a test plate. The test plates thus obtained were immersed in the above composition in accordance with the procedure shown in Table 2 to form a film on each of the plates (Examples 2 to 4). These test plates having said film and the test plates having no said film (Comparative Examples 2 to 3) were subjected to a salt spray test (JIS Z 2371) to obtain the results shown in Table 2.

TABLE 2

| | Procedure of treatment of test plate | After 240 hr of salt spray test |
|---|---|---|
| Example 2 | Heating for 20 min at 200° C. → Immersion in the composition → Air-drying for one night | Little rust observed |
| Example 3 | Immersion in the composition → Air-drying for one night → Heating for 20 min at 200° C. | Little rust observed |
| Example 4 | Immersion in the composition → Air-drying for one night | Little rust observed |
| Comparative Example 2 | Degreasing → Air-drying | White rust appeared slightly. |
| Comparative Example 3 | Degreasing → Heating for 20 min at 200° C. | Red rust appeared severely |

EXAMPLE 5

Using the same composition as in Example 2, except that 0.05 mole of N-(β-aminoethyl)-γ-aminopropylmethyldimethoxysilane was used as an aminoalkylpolyalkoxysilane, the same test as in Example 2 was conducted. After 240 hr of salt spray test, little rust was observed.

EXAMPLE 6 AND COMPARATIVE EXAMPLE 4

As rust-preventive composition solutions, there were used solutions shown in Table 3, namely, a solution containing the composition of the present invention (Example 6) and a solution containing a nylon copolymer (Comparative Example 4). Test plates were prepared by subjecting steel rods (each 10 mm in diameter and 100 mm in length) to zinc plating treatment and chromate treatment in the same procedure as in Example 2, and then heating the thus treated steel rods at 200° C. for 60 min, followed by cooling. These test plates were immersed in the above rust-preventive composition solutions, air-dried and then evaluated by salt spray test (JIS Z 2371), to obtain the results shown in Table 3.

EXAMPLES 7 TO 9 AND COMPARATIVE EXAMPLES 5 to 7

The same composition as in Example 2 was used. As test plates, there were used commercially available zinc chromate bolts having yellow, green, and black chromate films (zinc chromate bolt refers hereinafter to a bolt produced by applying zinc plating onto a steel bolt and further applying thereonto a chromate treatment). These test plates were treated with the composition of the present invention in Examples 7 to 9 as shown in Table 4, but were not in Comparative Examples 5 to 7. These test plates were evaluated by a salt spray test (JIS Z 2371). The results obtained are shown in Table 4. The composition of the present invention showed excellent effects for all chromate films which had undergone heat treatment.

TABLE 4

| | Chromate film on substrate (bolt) | Treatment of substrate | Thickness of coating film (μm) | After 285 hr of salt spray test | |
|---|---|---|---|---|---|
| | | | | White rust | Red rust |
| Example 7 | Yellow chromate | Heated at 300° C. for 5 min, cooled, immersed in the composition of the present invention and then air-dried. | 2 to 5 | Substantially no | No |
| Example 8 | Green chromate | | 2 to 5 | Substantially no | No |
| Example 9 | Black chromate | | 2 to 5 | Slightly appeared | No |
| Comparative Example 5 | Yellow chromate | Heated at 300° C. for 5 min, and then cooled. (No further treatment) | — | — | Appeared on the entire surface |
| Comparative Example 6 | Green chromate | | — | Appeared on the entire surface | Appeared |
| Comparative Example 7 | Black chromate | | — | Appeared on the entire surface | Appeared |

EXAMPLES 10 TO 11 AND COMPARATIVE EXAMPLES 8 to 11

11.05 Grams (0.05 mole) of γ-aminoinopropyltriethoxysilane (molecular weight: 221) as a silicon compound and 14.00 g (0.01 mole) of a bisphenol A type epoxy resin [Epikote 1004 (brand name) manufactured by Yuka Shell Epoxy K.K., average molecular weight: 1400]as a compound having at least one oxirane ring were diluted with 225.45 g of a mixed solvent consisting of equal parts by weight of toluene and methyl ethyl ketone, to prepare a coating composition (A) containing 10% by weight of the above effective components.

As test plates, there were used commercially available zinc chromate (yellow) bolts M-10/45 produced by applying zinc plating onto a steel material and then applying thereonto a yellow chromate treatment. In Examples 10 to 11, these test plates were coated with the above coating composition (A) and air-dried for 24 hr to obtain bolts of the present invention each having a coating film of 2 to 5 μm in thickness. In Comparative Examples 8 and 9, the above test pieces were coated with an epoxy-phenol type coating composition containing 10% by weight of non-volatile matters [P-105

TABLE 3

| | Composition of rust-preventive solution | | | | |
|---|---|---|---|---|---|
| | Effective components (Molar ratio) | Solvents (Weight ratio) | Concentration of effective components (% by weight) | Film thickness (μm) | After 240 hr of salt spray test |
| Example 6 | γ-Aminopropyl-triethoxysilane/γ-glycidoxy-propyltrimethoxy-silane = 1/0.5 | Toluene/methyl ethyl ketone = 1/1 | 10 | 3 to 5 | Little rust observed |
| Comparative Example 4 | 6/6-6/6-10 nylon copolymer | Methanol/trichloro-ethylene = 1/1 | 5 | 5 to 15 | White rust and red rust appeared |

(brand name) manufactured by TOAGOSEI CHEMICAL INDUSTRY CO., LTD.]and then subjected to baking for 5 min in an oven at 200° C. to obtain bolts each having a resin film of 2 to 5 μm in thickness. In Comparative Examples 10 and 11, the above test pieces were subjected only to degreasing treatment with methyl ethyl ketone. Some of the bolts thus obtained were subjected to salt spray test (JIS Z 2371) for 360 hr under tension in the axial direction, and the others were under no tension to examine formation of rust. In each Example and each Comparative Example, ten bolts were used for the same test. The results obtained are shown in Table 5. The threaded elements of the present invention were apparently excellent in corrosion resistance.

TABLE 5

| | Treatment of bolt | Tension in axial direction | Rusting White rust | Red rust |
|---|---|---|---|---|
| Example 10 | Coated with the composition (A) and then | No | Substantially no | No |
| Example 11 | air-dried for 24 hr | 1500 kg | Substantially no | No |
| Comparative Example 8 | Coated with P-105 and then baked | No | — | Appeared on the entire surface |
| Comparative Example 9 | | 1500 kg | — | Appeared on the entire surface |
| Comparative Example 10 | Degreased and then air-dryed for | No | Appeared | No |
| Comparative Example 11 | 24 hr | 1500 kg | Much | Appeared |

EXAMPLES 12 TO 13 AND COMPARATIVE EXAMPLES 12 TO 13

To 0.05 mole of N-(β-aminoethyl)-γ-aminopropyltrimethoxysilane as a silicon compound and 0.015 mole of γ-glyoidoxypropyltrimethoxysilane as a compound having at least one oxirane ring were added a mixed solvent consisting of equal parts by weight of toluene and methyl Cellosolve to prepare a coating composition (B) having a concentration of the above effective components of 10% by weight. In Examples 12 and 13, the same commercially available bolts as in Example 10 were coated with the above composition (B) in the same manner as in Example 10 to obtain bolts of the present invention. In Comparative Examples 12 and 13, the same commercially available bolts were coated with a solution obtained by dissolving a vinyl chloride-vinyl acetate-maleic acid copolymer [S-LEC M (brand name) manufactured by Sekisui Chemical Co., Ltd.]in 1,1,1-trichloroethane at a concentration of 10% by weight and then air-dried for 24 hr to obtain resin-coated bolts. All these bolts were subjected to a salt spray test in the same manner as in Example 10. The results obtained are shown in Table 6.

TABLE 6

| | Treatment of bolt | Tension in axial direction | Rusting White rust | Red rust |
|---|---|---|---|---|
| Example 12 | Coated with the composition (B) and then | No | Substantially no | No |
| Example 13 | air-dried for 24 hr | 1500 kg | Substantially no | No |
| Comparative Example 12 | Coated with a S—LEC M solution and then | No | Slight | No |
| Comparative Example 13 | air-dried for 24 hr | 1500 kg | Much | Appeared |

EXAMPLES 14 TO 17 AND COMPARATIVE EXAMPLES 14 TO 17

Four kinds of test bolts were used, namely, zinc chromate (green) bolts M-10/45 (commercial product) produced by applying zinc plating onto steel bolts and further applying thereonto a green chromate treatment, zinc chromate (black) bolts M-10/45 (commercial product) produced by applying zinc plating onto steel bolts and further applying thereonto a black chromate treatment, the same zinc chromate (yellow) bolts M-10/45 as in Example 10, and nickel/chromium-plated bolts M-10/45 (commercial porduct) produced by applying nickel plating onto steel bolts and further applying thereonto chromium plating. In Examples 14 to 17, these bolts were coated with the composition (A) in the same manner as in Example 10 and then heat-treated at 250° C. for 15 min. In Comparative Examples 14 to 17, the above bolts were subjected to simple degreasing treatment and then heat-treated at 250° C. for 15 min. All these bolts were then subjected to salt spray test (JIS Z 2371) for 240 hr. In each Example and each Comparative Example, ten bolts were used for the same test. The results obtained are shown in Table 7.

TABLE 7

| | Kind of bolt | Treatment of bolt | Rusting White rust | Red rust |
|---|---|---|---|---|
| Example 14 | Zinc chromate (yellow) | Coated with the composition (A), air-dried, | Substantially no | No |
| Example 15 | Zinc chromate | and then heated at | Substantially | No |

TABLE 7-continued

| | Kind of bolt | Treatment of bolt | Rusting | |
|---|---|---|---|---|
| | | | White rust | Red rust |
| | (green) | 250° C. for 15 min | no | |
| Example 16 | Zinc chromate (black) | | Slight | No |
| Example 17 | Nickel/chromium plating | | — | No |
| Comparative Example 14 | Zinc chromate (yellow) | Degreased, air-dried, and then heated at 250° C. for 15 min | — | Appeared on the entire surface |
| Comparative Example 15 | Zinc chromate (green) | | Appeared on the entire surface | Appeared |
| Comparative Example 16 | Zinc chromate (black) | | Appeared on the entire surface | Appeared |
| Comparative Example 17 | Nickel/chromium plating | | — | Appeared |

EXAMPLE 18

Ten same self-locking bolts of the present invention were prepared by baking an epoxy phenol type coating composition (P-105) on the same zinc chromate (yellow) bolts as in Example 10, in the same manner as in Comparative Example 8, heating the thus treated bolts at 250° C. and melt-coating them with 0.025 to 0.030 g (per bolt) of nylon-11 powder [Rilsan Fine Powder (brand name) produced by Nihon Rilsan K.K.]for giving the bolts a self-locking property, cooling the bolts, coating them with the same composition (A) as in Example 10, and air-drying the thus coated bolts for 24 hr. The bolts thus prepared were subjected to a salt spray test (JIS Z 2371) for 360 hr. In each bolt, there was little appearance of white rust and no appearance of red rust.

What is claimed is:

1. A threaded metal element having coated thereon a film of reaction product between (a) an organic silicon compound having at least one aminoalkyl group and at least one alkoxy group and (b) a compound having at least one oxirane ring.

2. A threaded metal element according to claim 1, wherein the metal comprises copper, copper alloy, zinc-plated iron or zinc-plated steel.

3. A threaded metal element according to claim 1, wherein the metal comprises steel.

4. A threaded metal element according to claim 1, wherein the organic silicon compound (a) comprises an aminoalkyltrialkoxysilane, an N-(aminoalkyl) aminoalkyltrialkoxysilane, an aminoalkylalkyldialkoxysilane or an N-(aminoalkyl)aminoalkylalkyldialkoxysilane.

5. A threaded metal element according to claim 1, wherein the organic silicon complund (a) comprises at least one member selected from the group consisting of aminomethyltriethosysilane, γ-aminopropyltriethoxysilane, γ-aminoisolbutyltrimethoxysilane, N-(β-aminoethyl)-aminomethyltrimethoxysilane, N-β-aminoethyl) aminomethyltriethoxysilane, N-(β-aminoethyl)-γ-aminopropyltrimethyldiethoxysilane, and N-(β-aminoethyl)-γ-aminopropylmethoxysilane.

6. A threaded metal element according to claim 1, wherein the organic silicon compound (a) has at least two alkoxy groups.

7. A threaded metal element according to claim 1, wherein the compound having at least one oxirane ring (b) is an epoxy resin represented by the formula:

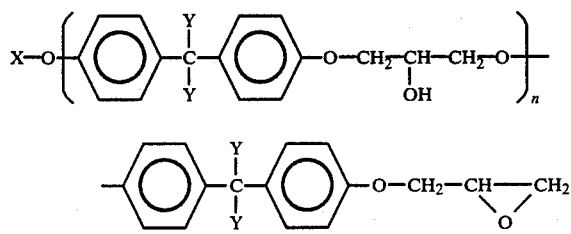

wherein X is

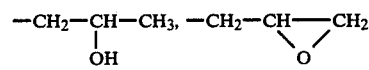

or a hydrogen atom and Y is an alkyl group or a hydrogen atom; a glycidylamine type epoxy resin represented by the formula $X^1{}_2N-R^1-NX^1{}_2$ or $$X^1{}_2N-R^2-NX^1{}_2$$
$$\phantom{X^1{}_2N-R^2-}|$$
$$\phantom{X^1{}_2N-R^2-}NX^1{}_2$$

wherein $X^1$ is

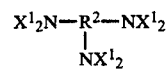

$R^1$ is an alkylene group, an aralkylene group or a cycloalkylene group and $R^2$ is an aliphatic hydrocarbon residue; or a novolak type epoxy resin represented by the formula:

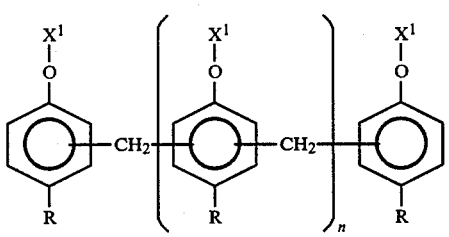

wherein $X^1$ is

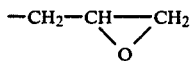

and R is an alkyl group or an aralkyl group.

8. A threaded metal element according to claim 1, wherein the compound having at least one oxirane ring (b) is an organic silicon compound having an oxirane ring and alkoxy groups.

9. A threaded metal element according to claim 1, wherein the organic silicon compound having an oxirane ring and alkoxy groups is a glycidoxyalkyltrialkoxysilane or a glycidoxyalkylalkyldialkoxysilane.

10. A threaded metal element according to claim 1, wherein the molar ratio of the organic silicon compound (a) to the compound having at least one oxirane ring (b) in terms of average molecular weight is 1:0.05 to 1.

11. A threaded metal element according to claim 1, wherein the molar ratio of the organic silicon compound (a) to the compound having at least one oxirane ring (b) in terms of average molecular weight is 1:0.2 to 0.9.

12. A threaded metal element according to claim 1, wherein the total concentration of the organic silicon compound and the compound having at least one oxirane ring is 1 to 30% by weight.

13. A threaded metal element according to claim 1, wherein said metal is chromate-coated.

14. A threaded metal element in accordance with claim 13, wherein said metal comprises a metal selected from the group consisting of iron, steel, stainless steel, nickel, aluminum, copper, brass, gunmetal.

15. A threaded metal element according to claim 1, wherein said threaded metal element is selected from the group consisting of a nut, a screw or a bolt.

16. A threaded metal element according to claim 1, wherein the metal comprises iron, steel, stainless steel, nickel, aluminum, copper, brass or gunmetal.

17. A threaded metal element according to claim 15, wherein said substrate comprises steel.

18. A plurality of threaded metal elements having coated thereon a film of reaction product between (a) an organic silicon compound having at last one aminoalkyl group and at least one alkoxy group and (b) a compound having at least one oxirane ring.

19. A method of producing a threaded metal element comprising coating a threaded metal element with a film comprising the reaction product between (a) an organic silicon compound having at least one aminoalkyl group and at least one alkoxy group and (b) a compound having at least one oxirane ring.

* * * * *

UNITED STATES PATENT AND TRADEMARK OFFICE
CERTIFICATE OF CORRECTION

PATENT NO. : 4,642,011
DATED : February 10, 1987
INVENTOR(S) : URAMOTO et al

It is certified that error appears in the above-identified patent and that said Letters Patent is hereby corrected as shown below:

On the Title Page:

[73] Assignee: Toagosei Chemical Industry Co., Ltd.
Tokyo, Japan

Signed and Sealed this

Eighth Day of September, 1987

*Attest:*

DONALD J. QUIGG

*Attesting Officer*          *Commissioner of Patents and Trademarks*